Oct. 2, 1956 C. J. NEUMAN 2,764,769
COUPLING FOR PRESSURE LUBRICATING DEVICES
Filed May 21, 1951
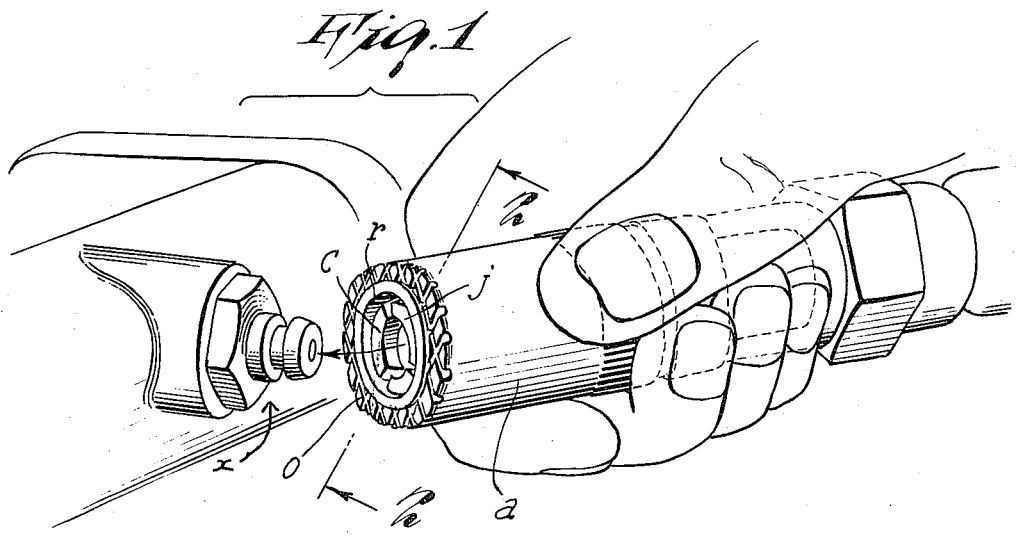
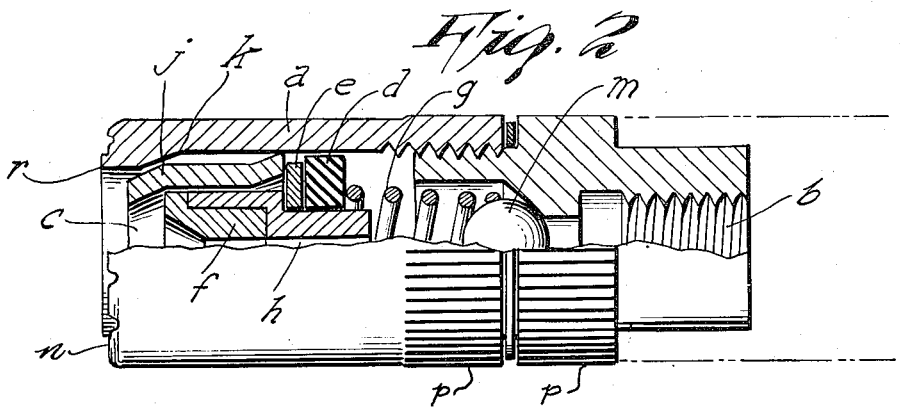
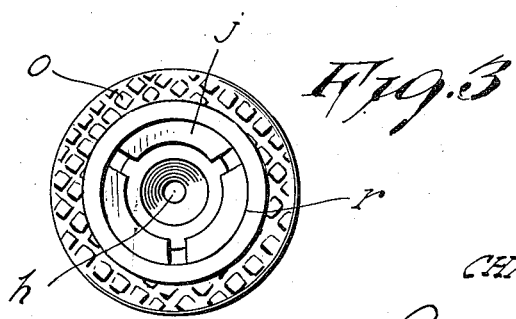
INVENTOR.
CHAIM JAKOB NEUMAN
BY
his ATTORNEYS

United States Patent Office 2,764,769
Patented Oct. 2, 1956

2,764,769

COUPLING FOR PRESSURE LUBRICATING DEVICES

Chaim Jakob Neuman, South Croydon, England

Application May 21, 1951, Serial No. 227,311

Claims priority, application Great Britain July 10, 1950

2 Claims. (Cl. 15—105)

This invention relates to a coupling for pressure lubricating devices, and is concerned more especially with a coupling including a cylindrical body with a flat circular roughened surface at one end thereof combined with a sharp annular ridge disposed radially inwardly of the roughened surface and projecting axially therebeyond for cleaning a lubricating nipple before supplying lubricant thereto.

An object of the present invention is to provide devices for the aforesaid purpose having advantages in ease of manufacture and for assembly, and including, separately or together, any one or more of a number of novel and advantageous features as will appear more fully hereinafter.

The invention also includes a coupling for a pressure lubricating device, e. g., a grease gun, provided with a roughened, knurled or otherwise cutting or abrasive surface, and/or with a sharp edge or knife edge, conveniently located for use to clear the inlet or surface of a nipple or like lubricating inlet, with which the lubricating device is to be used.

The invention, and the various features thereof which may be employed separately or together in a device for delivering fluid or semi-fluid materials under pressure, according to the invention will be clearly understood from the following description of various forms which the different features of the invention may assume, and this description will be more readily followed by reference to the accompanying drawings wherein:

Figure 1 is a perspective view illustrating a coupling in accordance with the invention about to be connected to or just disconnected from a cooperating lubricating nipple.

Figure 2 is a side elevational view, partly shown in axial longitudinal section of the coupling shown in Fig. 1.

Figure 3 is a front end view of the coupling shown in Figs. 1 and 2.

Referring to Fig. 1 of the drawing, there is shown a coupling comprising a tubular cylindrical body $a$. The coupling is shown about to be connected to or just disconnected from a lubricating nipple designated generally as $x$.

The coupling is provided with an internally threaded shank $b$ adapted for connection to a source of lubricant under pressure (not shown). The coupling comprises a forwardly opening aperture $c$ defined by jaws $j$ for cooperation with the lubricating nipple $x$. An annular piston in the form of a resilient non-metallic washer such as an artificial rubber washer $d$ bonded to steel or backed by a steel washer $e$ makes a peripherally fluid tight seal with the body $a$ and an internally conically faced seat $f$ is provided which is intended to make a fluid tight joint with the inserted nipple. A spring $g$ urges the piston $d$ towards the nipple and a passage $h$ allows fluid to pass through the whole coupling to the nipple at $c$.

The retaining jaws are made up of segments or claws $j$ it being their function to anchor one member of the coupling to the other.

In this construction it will be seen that the jaws $j$ are inwardly curved and co-act with a similarly faced internal conical portion $k$ of the body $a$. Thus, longitudinal movement of the jaws $j$ provides a cam action between the jaws $j$ and the conical seating face $f$ causing inward nipple gripping movement of the jaws.

In use, when the coupling is placed in position against a nipple, the nipple will force the seating $f$ and the jaws $j$ toward the right (as viewed in Fig. 2 of the drawing). This gives inward and consequential outward movement of the jaws $j$ and allows the jaws $j$ to clear the greatest diameter of the nipple $x$ by enlargement of the aperture $c$. After the connection has been made and the fluid under pressure enters the interior of the body $a$ through the spring-pressed ball valve $m$, the pressure of the fluid against the piston or washer $d$ and associated parts will force the jaws $j$ leftwardly giving a cam action against the frusto-conical face $k$. The jaws $j$ will thus be convergently urged and will grip the nipple firmly in position. At the same time the oil seal is made between the facing $f$ and the nipple in the manner desired.

Owing to the segments $j$ not being a complete annulus (there will be preferably three segments $j$), the nipple can be removed without difficulty when desired by sideways motion of the gun as by pivoting it about the aperture $c$ and thus breaking the connection.

As it is well known a nipple or like element through which it is necessary occasionally to deliver lubricant or like material under pressure frequently becomes blocked with grit or dirt, and according to this feature of the invention the forward portion of the coupling is formed in such a manner that it can be employed to free the nipple or like element from grit or dirt when necessary.

A coupling made in accordance with this feature of the invention is characterised in that a portion of the body is provided with a knife edge and/or a knurled or otherwise roughened or abrasive surface so disposed as to present an easy means of cleaning the surface of a nipple from adherent dirt or grit before connecting the coupling to the nipple.

As shown in the drawing, the front or outer edge $n$ of the body $a$ which surrounds the jaws $j$ is flat and thus presents an annular plane surface normal to the longitudinal axis of the nipple and its surrounding material. This plane annulus is provided with a fine cleanly cut diamond or similar knurl $o$ (Figs. 1 and 3) so that when it is rotated or otherwise moved in relation to the nipple it will act as a file, rasp or scraper.

The radially inwardly disposed inner edge of such surface and any other conveniently disposed edge may be shaped with an axially forwardly projecting keen knife edge as at $r$ for a similar purpose.

The outer sides of the body may in addition conveniently be cut with a fine straight knurl as at $p$, so that the operator's fingers may conveniently get a good grip. Thus, rotation of the body before final coupling will be simplified and dirt can be removed.

In addition to rotation prior to coupling a sideways scraping motion will be effective to clear the nipple.

It will be found that the addition of these features to a coupling or like element will add very little to the cost of manufacture but will enable an improved article to be obtained.

It should be understood that the various features of the invention described above may separately be employed in different forms of equipment to which they are applicable, and, as regards the nipple-cleaning features, they may be applied to appropriate elements of a grease-gun or like device, other than the coupling.

What I claim is:

1. A coupling for a pressure lubricating device comprising a rigid tubular body adapted at one end to surround a lubricating nipple with which the coupling is to be engaged, means at the other end of said tubular body for securing said body to a lubricant-supply line, said body being formed at its nipple-surrounding end with a roughened surface extending substantially radially with respect to the axis of said tubular body, said body having an annular rib formed thereon radially inwardly of said roughened surface and extending axially therebeyond, said rib having a sharp annular cutting edge formed thereon at its end, said cutting edge extending peripherally around the inner side of said rib.

2. A coupling for a pressure lubricating device comprising a rigid tubular body adapted at one end to surround a lubricating nipple with which the coupling is to be engaged, means at the other end of said tubular body for securing said body to a lubricant supply-line, said body being formed at its nipple-surrounding end with a plane annular roughened surface perpendicular to the axis of said tubular body, and an upstanding annular rib within said annular roughened surface, said rib being formed with an inner sharp edge at its exposed end.

References Cited in the file of this patent

UNITED STATES PATENTS

| | | |
|---|---|---|
| 919,618 | McBee | Apr. 27, 1909 |
| 1,045,495 | Austin | Nov. 16, 1912 |
| 1,540,182 | Outhier | June 2, 1925 |
| 1,628,834 | Frank | May 17, 1927 |
| 1,744,305 | Gannaway | Jan. 21, 1930 |
| 1,751,660 | Saxton | Mar. 25, 1930 |
| 1,916,284 | Ragan | July 4, 1933 |
| 1,938,307 | Weber | Dec. 5, 1933 |
| 1,955,705 | Bizarri | Apr. 17, 1934 |
| 1,956,073 | Krause | Apr. 24, 1934 |
| 1,965,547 | Harris | July 3, 1934 |
| 1,984,878 | Johnson | Dec. 18, 1934 |
| 1,985,410 | Isaacs | Dec. 25, 1934 |
| 2,005,556 | Parker | June 18, 1935 |
| 2,598,765 | Dewey | June 3, 1952 |
| 2,629,888 | Sauer | Mar. 3, 1953 |
| 2,655,287 | Campbell | Oct. 13, 1953 |

FOREIGN PATENTS

| | | |
|---|---|---|
| 342,467 | France | Sept. 8, 1904 |